United States Patent [19]

Hikido et al.

[11] 3,750,266

[45] Aug. 7, 1973

[54] FLOW CONTROL OF FILLER ALLOY

[75] Inventors: Tsutomu Hikido, Sunnyvale; Craig R. Moyer, Palo Alto, both of Calif.

[73] Assignee: The United States of America as represented by the United States Atomic Energy Commission, Washington, D.C.

[22] Filed: Aug. 25, 1972

[21] Appl. No.: 283,695

Related U.S. Application Data

[63] Continuation of Ser. No. 881,913, Dec. 3, 1969, abandoned.

[52] U.S. Cl. .................................................. 29/490
[51] Int. Cl. ............................................ B23k 31/02
[58] Field of Search ........................... 29/490, 470.9; 117/5.5, 37, 38, DIG. 1, 131

[56] References Cited
UNITED STATES PATENTS

| | | | |
|---|---|---|---|
| 527,210 | 10/1894 | Margot | 117/DIG. 1 |
| 1,165,338 | 12/1915 | Moench | 117/DIG. 1 |
| 1,931,311 | 10/1933 | Young | 29/490 X |
| 3,025,184 | 3/1962 | Blair | 117/131 |
| 3,063,145 | 11/1962 | Bouton | 117/131 |
| 3,110,102 | 11/1963 | Pfefferkorn | 29/490 |
| 3,249,910 | 5/1966 | Verr et al. | 29/490 X |
| 3,478,413 | 11/1969 | Godd | 29/490 |
| 3,667,109 | 6/1972 | Alcenius | 29/490 |

*Primary Examiner*—Robert D. Baldwin
*Assistant Examiner*—Ronald J. Shore
*Attorney*—Roland A. Anderson

[57] ABSTRACT

A method for controlling the flow of filler alloy used in the brazing of metals such as stainless steel. The method consists of applying on the surface of the metal a layer of metal which acts as a barrier to the filler alloy, thereby confining the alloy to the desired area to be brazed and thus preventing its flow over undesired areas of the surface of the metal. The flow control metal may, for example, be applied to the surface by scribing, plating or vapor-deposition depending on the type of flow control metal utilized.

1 Claim, No Drawings

FLOW CONTROL OF FILLER ALLOY

This is a continuation of application Ser. No. 881,913, filed Dec. 3, 1969, and now abandoned.

BACKGROUND OF THE INVENTION

The invention described herein was made in the course of, or under, Subcontract W-31-109-38-1703 under Contract No. W-31-109-ENG-38, with the United States Atomic Energy Commission.

Much prior effort has gone into various methods of controlling the flow of brazing alloys so that the alloys will be confined to the desired area of the braze. Such prior efforts have been primarily directed to controlling the placement of the alloy, using stop-off material and forming grooves in the material at the boundary areas, the first two prior methods being more conventionally employed.

The first mentioned prior approach involves careful control over the amount and displacement of brazing alloy. While this method has the advantage of simplicity, it lacks the degree of precision required in some applications, i.e., too much or too little alloy is applied to cause excessive flow or inadequate bonding. The utilization of the method, therefore, is highly dependent on the skill of the operator.

The second mentioned prior approach involves the use of materials known as stop-offs. These materials are generally oxides of aluminum, chromium, titanium or magnesium. They are commonly prepared in the form of a water slurry and are painted onto the area to be protected. Stop-off materials are available commercially, and they offer greater control over the filler alloy than is obtained by simply regulating the quantity and placement of alloy used. However, investigation of these stop-offs, particularly in the brazing of stainless steel, revealed severe shortcomings which include difficulty in applying the slurry to the works, inadequate control over the flow of filler alloy, and leaving of a residue difficult to remove.

SUMMARY OF THE INVENTION

The present invention is somewhat akin to the use of stop-off materials to control the flow of filler alloy in that each method involves mashing the surface to be protected with a substance which prevents the alloy from coming in contact with it. However, the techniques of the instant invention for applying the materials to the surface overcome the problems of the conventionally known stop-off, and thus greatly advancing the state of the art.

Therefore, it is an object of this invention to provide a method for controlling flow of a filler alloy.

A further object of the invention is to provide a flow control method for brazing filler alloys.

Another object of the invention is to provide a method for controlling the flow of a brazing alloy on stainless steel.

Another object of the invention is to provide a flow control method for filler alloys which involves the application of a metal as a barrier to the filler alloy.

Another object of the invention is to provide a flow control method for filler alloys by the application of a metal on the surface adjacent the material to be brazed which forms a refractory oxide during the brazing operation which produces a barrier to the flow of the filler alloy.

Other objects of the invention will become readily apparent from the following description.

DESCRIPTION OF THE INVENTION

The inventive method, depending upon the materials utilized and the application requirements, can be accomplished through the techniques of scribing, vapor-depositing, or plating for applying to a metal surface a layer of flow control metal for preventing the flow of filler alloy over undersirable areas of the metal surface. In the following examples which illustrate each of the above techniques, stainless steel has been primarily used as the surface metal with aluminum, titanium or nickel as the flow control metal, and the hereinafter described tests conducted to verify the inventive method are also primarily directed to the use of stainless steel as the surface metal, although other metals have been utilized in carrying out the invention.

In the first of these techniques for carrying out the inventive method, the flow of brazing alloy across a metal surface such as stainless steel, is controlled by scribing lines on the surface with aluminum, such as by a pointed aluminum rod, which leaves a thin lined deposit or layer of aluminum. A refractory oxide forms during the brazing cycle on the aluminum layer deposited on the surface. This oxide film prevents wetting by the filler alloy and thus provides a barrier against undesirable flow of filler alloy while leaving only a thin tenacious residue of $Al_2O_3$.

Alloys containing aluminum are difficult to braze in dry hydrogen because of the formation of refractory aluminum oxide films. Even at 2,500° F, a hydrogen dewpoint of −140° F would be required to prevent oxidation of the aluminum. The equilibrium dewpoint would be even lower at the 2140°F brazing temperature. The hydrogen used in the tests conducted had a dewpoint of −80° F to −100° F at the inlet to the brazing retort. This atmosphere is considered to be of extremely high quality by any hydrogen brazing standards.

In the tests, aluminum welding rods, ⅛ inch in diameter, were ground to a point and used to scribe lines on a stainless steel surface. The film of aluminum, about 2-4 microinches, that was transferred to the stainless steel oxidized during the brazing cycle and restricted the flow of filler alloy. Two aluminum compositions, 1,100 (unalloyed) and 4043 (Al-5%Si) were tested, both in the annealed condition. The aluminum was usually applied by simply scribing the stainless steel surface with a pointed rod using a straight edge as a guide. Mechanical rotation of the aluminum rod and vibrating the rod were also tried during the scribing operation without as good results as with the manually scribed lines. The filler alloy in each case was applied with a brazing cycle of 2,100°-2,120° F with a two-hour hold at temperature.

These tests showed the aluminum scribing technique to be sensitive to the surface condition of the stainless steel. Fingerprints, acrylic binder traces or other surface contaminants tended to act as lubricants for the aluminum scribe and cause a discontinuity in the aluminum film transferred to the stainless steel. It was found that scribing before the filler alloy and binder were applied overcome these surface contaminant problems.

It was found that the softer unalloyed 1,100 aluminum rod worked better than the 4043 rod. The softer material rubbed off and transferred to the stainless steel better. When the aluminum layer scribed on the stainless steel was heavy, greater than 4 microinches, there was a reaction with the surface of the stainless steel (as manifest by an etching reactor). In general, the test showed that the scribing techique using an aluminum rod was effective as a flow control technique for filler alloy, particularly where the surface was clean and scribed before the alloy and binder were applied. While there were occasional areas where the filler alloy flowed beyond the scribed line, the scribing of closely spaced multiple lines eliminated this problem.

Therefore, the scribing, for example, of a stainless steel surface with a soft, pointed aluminum rod is an effective techique for filler alloy flow control. The material is inexpensive, easy to apply accurately, and does not leave any detrimental residue. As pointed out above, surface contaminations and too heavy an aluminum deposit appear to be the only drawback in utilizing this technique and these are overcome by the scribing of closely spaced, mutliple lines.

In the second of the above mentioned techniques for carrying out the inventive method, undesirable flow of brazing filler alloy is controlled by vapor depositing a layer of titanium or aluminum on a metal surface, such as stainless steel. A refractory oxide forms on this vapor deposited layer to provide an effective barrier to filler alloy flow.

In one test conducted to verify this technique, an $Al_2O_3$ layer less than 10 microinches vapor deposited on plain carbon steel completely stopped the flow of Ni-Cr-Si filler alloy.

Other tests conducted on this technique involved the vacuum vapor deposition of aluminum and titanium on stainless steel. The two metals were deposited on stainless steel plates in two parallel strips approximately ⅛ inch wide and 3/16 to ¼ inch apart. Three thicknesses, 100 Angstroms ($0.4 \times 10^{-6}$ inch), 300 Angstoms ($1.2 \times 10^{-6}$ inch) and 1,000 Angstroms ($4 \times 10^{-6}$ inch), of each metal were deposited on the stainless steel plates. The thus prepared test plates were brazed at 2,120° F with a two-hour hold at temperature. Results of these tests show that even the thinnest titanium deposit stopped the flow of filler alloy. The aluminum became partially effective at 300 Angstroms and completely stopped the flow at the 1,000 Angstrom thickness. These tests showed the absence of any surface reaction between either the titanium or the aluminum and the stainless steel even with a vapor deposited thickness of 1,000 Angstroms. The only noted drawback of the vapor deposition technique may be the cost compared to the cost of the scribing technique. Also the vapor deposited titanium plates showed a slight warping apparently due to either the heat of the vapor source or by the heat applied to the plate to obtain an adherent deposit but production vapor deposition techniques will overcome this problem. This technique is primarily for use in hydrogen brazing atmosphere. While tests were not conducted in vacuum or inert gas brazing environment, it is expected that the flow control would be less effective in these atmospheres.

In the third of the above mentioned techniques for carrying out the inventive method, the flow of brazing alloy across a metal surface, such as stainless steel, is controlled by plating a nickel strip adjacent the desired containment area of the filler alloy.

In the test to verify this flow control technique, the nickel plating was applied by two conventional techniques to stainless steel plates, one was by standard electroplating in a sulfamate bath and the second was by the brush (Dalic) plating in which the electrolyte is held in a cotton swab which is brushed across the surface to be plated. Plating thickness of 0.0001 inch to 0.0004 inch were tested. These tests were conducted with the same filler alloy as in the above described tests, and with the 2,140° F and two-hour hold brazing cycle. Again the brazing results were evaluated both visually and metallographically on transverse sections.

It was found that nickel plating 0.0002 to 0.0003 inch, on thicker, controlled filler alloy flow effectively. The nickel plating very neatly defined the filler alloy flow and provided a tapered transition area of the braze edge to the plate. The mechanism is postulated to involve an alloying reaction between the filler alloy and the nickel plating. When the plating is separated from the immediate vicinity of the joint, the molten filler alloy is flowing as a relatively thin film where it meets the plating. The nickel to filler alloy ratio at the interface is enough to raise the melting point and retard the flow. On the other hand, when the plating is adjacent to the joint, there is a relatively large amount of filler alloy in that area and the proportion of nickel taken into solution is not enough to effect the melting point or flow significantly, but eventually enough nickel is picked up to make the filler alloy flow sluggish but allows an overflow and not the neatly defined edge as when the plating is spaced from the joint.

The nickel plating flow control technique is effective only for those brazing filler alloys which would alloy with nickel to form higher melting composition.

As with the vapor deposition technique, the nickel plating technique is more expensive than the scribing technique, although it provides a more neatly defined filler alloy flow control.

It has thus been shown that the present invention provides a method for controlling the flow of filler alloys and techniques for carrying out same which overcome the problems of the prior known flow control methods, thus greatly advancing the state of the art.

While particular techniques for carrying out the inventive method have been described, modifications and changes will become apparent to those skilled in the art, and it is intended to cover in the appended claims all such modifications and changes as come within the spirit and scope of the invention.

We claim:

1. In a process for controlling the flow of molten brazing alloy on a metallic substrate by bounding selected areas to be wet with an aluminum stop-off material, the improvement comprising bounding said areas with a 2 to 4 microinch thick lineal deposit of aluminum by scribing with an aluminum rod.

* * * * *